US012794677B2

(12) United States Patent
Lundberg et al.

(10) Patent No.: US 12,794,677 B2
(45) Date of Patent: Nov. 10, 2026

(54) APPLYING A SERVER PARTIAL SECRET KEY CONDITIONAL ON BLOCKED STATUS

(71) Applicant: ASSA ABLOY AB, Stockholm (SE)

(72) Inventors: Frans Lundberg, Saltsjöbaden (SE); Andrzej Bohdan Kostyk, Wieliczka (PL); Krzysztof Grzegorz Fabjanski, Bielsko-Biala (PL); Adam Augustyn, Krzeszowice (PL)

(73) Assignee: ASSA ABLOY AB, Stockholm (SE)

( * ) Notice: Subject to any disclaimer, the term of this patent is extended or adjusted under 35 U.S.C. 154(b) by 176 days.

(21) Appl. No.: 18/687,447

(22) PCT Filed: Oct. 26, 2022

(86) PCT No.: PCT/EP2022/079989
§ 371 (c)(1),
(2) Date: Feb. 28, 2024

(87) PCT Pub. No.: WO2023/073047
PCT Pub. Date: May 4, 2023

(65) Prior Publication Data

US 2025/0233731 A1 Jul. 17, 2025

(30) Foreign Application Priority Data

Oct. 26, 2021 (SE) .................................... 2151304-9
Oct. 26, 2021 (SE) .................................... 2151306-4

(51) Int. Cl.
*H04L 9/08* (2006.01)

(52) U.S. Cl.
CPC ............ *H04L 9/0825* (2013.01); *H04L 9/085* (2013.01); *H04L 9/0891* (2013.01)

(58) Field of Classification Search
None
See application file for complete search history.

(56) References Cited

U.S. PATENT DOCUMENTS 9,032,212 B1 5/2015 Juels
9,489,522 B1 11/2016 El Defrawy et al.
(Continued)

FOREIGN PATENT DOCUMENTS

CN 110289968 9/2019
EP 3496331 6/2019
(Continued)

OTHER PUBLICATIONS

Github, "bnb-chain tss-lib: Threshold Signature Scheme, for ECDSA and EDDSA", [Online]. Retrieved from the Internet: https: github. com bnb-chain tss-lib, (Accessed online Jun. 5, 2025), 5 pages.
(Continued)

*Primary Examiner* — Bassam A Noaman
(74) *Attorney, Agent, or Firm* — Schwegman Lundberg & Woessner, P.A.

(57) ABSTRACT

It is provided a method for applying a server partial secret key conditional on blocked status, wherein the server partial secret key (10*b*) and a user partial secret key (10*a*) form part of a threshold cryptography scheme (11), the method comprises: receiving (40) a request to apply a server partial secret key (10*b*) for a requested cryptographic operation for a user device (2): determining (42) that the server partial secret key (10*b*) can validly be applied by determining that the server partial secret key (10*b*) is not blocked from being applied; and interacting (44) with the user device (2) to perform the requested cryptographic operation, such that the user device (2) applies the user partial secret key (10*a*) and the validation server applies the server partial secret key (10*b*).

7 Claims, 3 Drawing Sheets

(56) References Cited

U.S. PATENT DOCUMENTS

| | | | | |
|---|---|---|---|---|
| 9,813,244 | B1 | 11/2017 | Triandopoulos et al. | |
| 10,547,444 | B2 * | 1/2020 | Harris | H04L 63/06 |
| 10,903,991 | B1 * | 1/2021 | Craige | H04L 9/085 |
| 11,025,598 | B1 | 6/2021 | Laghaeian et al. | |
| 2009/0161866 | A1 * | 6/2009 | Riedl | H04L 9/12 380/44 |
| 2015/0113276 | A1 * | 4/2015 | Day | H04L 9/0819 713/171 |
| 2017/0103228 | A1 | 4/2017 | Yavuz | |
| 2017/0324545 | A1 | 11/2017 | Brandenburger et al. | |
| 2018/0323969 | A1 | 11/2018 | Pahl et al. | |
| 2019/0034936 | A1 | 1/2019 | Nolan et al. | |
| 2019/0229929 | A1 | 7/2019 | Camenisch et al. | |
| 2020/0134212 | A1 | 4/2020 | Hutchison et al. | |
| 2021/0091934 | A1 * | 3/2021 | Fletcher | H04L 9/0847 |
| 2021/0314142 | A1 | 10/2021 | Lai et al. | |
| 2022/0067176 | A1 * | 3/2022 | Charles | H04L 9/085 |
| 2022/0393858 | A1 * | 12/2022 | Barger | H04L 9/50 |

FOREIGN PATENT DOCUMENTS

| | | |
|---|---|---|
| WO | 2021130748 | 7/2021 |
| WO | 2023073047 | 5/2023 |

OTHER PUBLICATIONS

Wikipedia, "Secure multi-party computation", [Online]. Retrieved from the Internet: https: en.wikipedia. org wikiSecure_multi-party_computation, (Accessed online Jun. 4, 2025), 13 pages.

"PCT EP2022079989 IPRP mailed Jan. 24, 2026", 14 pages.

"PCT EP2022079989 ISR mailed Feb. 17, 2023", 5 pages.

"PCT EP2022079989 Written Opinion mailed Fed. 17, 2023", 7 pages.

"PCT EP2022079989 Written Opinion mailed Sep. 19, 2023", 6 pages.

"SE application 2151304-9 Office Action mailed Jun. 9, 2022", 8 pages.

"SE application 2151304-9 2nd Office Action mailed Sep. 22, 2023", 6 pages.

"SE application 2151306-4 Office Action mailed Jun. 13, 2022", 7 pages.

Arthur, Marcella P., "Unbound Tech Raises $20M In Series B Funding to Support Global Growth", [Online]. Retrieved from the Internet: https: www.prnewswire.com news-releases unbound-tech-raises-20m-in-series-b-funding-to-support-global-growth-301174564.html, (Nov. 17, 2020), 4 pages.

Assa Abloy, "Java library for dual signing two part singing and dual decryption two part decryption based on the NaCI library primitives", [Online]. Retrieved from the Internet: https: github.com assaabloy-ppi dualsalt, (Accessed online Feb. 26, 2024), 4 pages.

Aumasson, Jean Philippe, "A Survey of ECDSA Threshold Signing", Cryptology ePrint Archive, (Nov. 2020), 14 pages.

Bernstein, Daniel J., "High-speed high-security signatures", Journal of Cryptographic Engineering vol. 2, (Aug. 14, 2012), 23 pages.

BNB Chain TSS Lib, "Threshold Signature Scheme, for ECDSA and EDDSA", [Online]. Retrieved from the Internet: https: github.com bnb-chain tss-lib, (Accessed online Feb. 26, 2024), 4 pages.

Brandao, Luis T. A. N., "NIST Roadmap Toward Criteria for Threshold Schemes for Cryptographic Primitives", NIST Interagency Internal Report NISTIR 8214A, (Jul. 2020), 39 pages.

Certicom Research, "SEC 2: Recommended Elliptic Curve Domain Parameters", Certicom Research Version 1.0, (Sep. 20, 2000), 51 pages.

Gillmor, D., "Negotiated Finite Field Diffie-Hellman Ephemeral Parameters for Transport Layer Security (TLS)", ISSN: 2070-1721, (Aug. 2016), 29 pages.

Hakanols, "Threshold signing and decryption inspired by TweetNaCI", [Online]. Retrieved from the Internet: https:github.com hakanols ThresholdSalt, (Accessed online Feb. 26, 2024), 2 pages.

Hallam Baker, Phillip, "Threshold Signatures in Elliptic Curves", [Online]. Retrieved from the Internet: https:datatracker.ietf.org doc draft-hallambaker-threshold-sigs , (Accessed online Feb. 26, 2024), 2 pages.

Hallam-Baker, P. M., "Threshold Signatures in Elliptic Curves", [Online]. Retrieved from the Internet: https: www.ietf.org archive id draft-hallambaker-threshold-sigs-06.html, (Jan. 13, 2021), 24 pages.

Kel BZ, "P-256 in Sage", [Online]. Retrieved from the Internet: https: kel.bz post sage-p256 , (Jan. 10, 2020), 3 pages.

Mohaisen, Abedelaziz, "Protection Techniques of Secret Information in Non tamper Proof Devices of Smart Home Network", UIC 2008 Lecture Notes in Computer Science vol. 5061, (Jun. 2008), 15 pages.

Various, "Ed25519 high-speed high-security signatures Papers", [Online]. Retrieved from the Internet: https:ed25519.cr.yp.to papers.html, (Accessed online Feb. 26, 2024), 1 page.

Wikipedia, "Edwards curve", [Online]. Retrieved from the Internet: https: en.wikipedia.org wiki Edwards_curve, (Accessed online Feb. 26, 2024), 8 pages.

* cited by examiner

APPLYING A SERVER PARTIAL SECRET KEY CONDITIONAL ON BLOCKED STATUS

CROSS-REFERENCE TO RELATED APPLICATION(S)

This application is a national stage application under 35 U.S.C. § 371 of PCT Appl. No. PCT/EP2022/079989, titled "Applying a Server Partial Secret Key Conditional on Blocked Status," filed Oct. 26, 2022, which claims priority to Swedish Patent Appl. No. 2151304-9, filed Oct. 26, 2021, and to Swedish Patent Appl. No. 2151306-4, filed Oct. 26, 2021, each of which is incorporated herein by reference in its entirety.

TECHNICAL FIELD

The present disclosure relates to the field of cryptographic operations, and in particular to applying a server partial secret key conditional on blocked status, wherein the server partial secret key and a user partial secret key form part of a threshold cryptography scheme.

BACKGROUND

As we use more and more digital applications in our lives, cryptography continually increases in popularity and use cases for securing various parts of our digital interaction. There is symmetric and asymmetric cryptography with various advantages. For instance, asymmetric cryptography can be used both for proving identity (using cryptographic signing) and decrypting data addressed to a specific user.

Traditional asymmetric cryptography is based on a public key and a secret key. The public key is tied to an entity/user and is shared publicly. The secret key is tied to the same entity, but is kept secret. Using the secret key, the entity can e.g. apply a cryptographic signature that can be verified by anyone using the public key. The secret key can also be used to decrypt data that has been encrypted by someone using the public key.

Authentication of user devices can be performed in many ways, including asymmetric cryptography. An issue arises if the user device with the secret key is compromised, e.g. lost or stolen. If an attacker manages to get hold of the user device, the attacker may be able to perform illegitimate cryptographic operations. This can lead to serious financial or social implications for the user of the user device.

The legitimate user may thus want to block the use of the secret key of the device e.g. by invalidating the old key pair and generating a new key pair. However, in order to make this possible, all devices storing the previous public key must be informed of the new public key of the new key pair. This is of course a security risk, since missing only one device storing a previous public key opens up for the use by an attacker of the stolen device.

SUMMARY

One object is to provide a way to block cryptographic operations by a user device that has been compromised, where no actions are required by devices holding the corresponding public key.

According to a first aspect, it is provided a method for applying a server partial secret key conditional on blocked status, wherein the server partial secret key and a user partial secret key form part of a threshold cryptography scheme associated with a public key. The method is performed in a validation server. The method comprises: receiving a request to apply a server partial secret key for a requested cryptographic operation for a user device; determining that the server partial secret key can validly be applied by determining that the server partial secret key is not blocked from being applied; interacting with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation; and obtaining an updated server partial secret key, corresponding to an updated user partial secret key that collectively form part of the threshold cryptography scheme that, wherein the update in partial secret keys still correspond to the public key.

The determining that the server partial secret key can validly be applied may comprise determining that a current time is within a pre-defined validity schedule.

The determining that the server partial secret key can validly be applied may comprise determining that an application of the cryptographic operation complies with a pre-defines set of valid applications.

The method may further comprise: receiving a message to block the server partial secret key corresponding to a particular user device; and storing an indication that the server partial secret key corresponding to the particular user device is blocked.

The obtaining an updated server partial secret key may be performed as a result of receiving a message to block the server partial secret key.

The obtaining an updated server partial secret key may be performed regularly based on a schedule.

According to a second aspect, it is provided a validation server for applying a server partial secret key conditional on blocked status, wherein the server partial secret key and a user partial secret key form part of a threshold cryptography scheme associated with a public key. The validation server comprises: a processor; and a memory storing instructions that, when executed by the processor, cause the validation server to: receive a request to apply a server partial secret key for a requested cryptographic operation for a user device; determine that the server partial secret key can validly be applied by determining that the server partial secret key is not blocked from being applied; interact with the user device to perform the requested cryptographic operation, such that the user device applies the user partial secret key and the validation server applies the server partial secret key, wherein a threshold of two partial secret keys of the threshold cryptography scheme are required for applying the threshold cryptography scheme for performing the requested cryptographic operation; and obtain an updated server partial secret key, corresponding to an updated user partial secret key that collectively form part of the threshold cryptography scheme that, wherein the update in partial secret keys still correspond to the public key.

The instructions to determine that the server partial secret key can validly be applied may comprise instructions that, when executed by the processor, cause the validation server to determine that a current time is within a pre-defined validity schedule.

The instructions to determine that the server partial secret key can validly be applied may comprise instructions that, when executed by the processor, cause the validation server to determine that an application of the cryptographic operation complies with a pre-defines set of valid applications.

The validation server may further comprise instructions that, when executed by the processor, cause the validation server to: receive a message to block the server partial secret key corresponding to a particular user device; and store an indication that the server partial secret key corresponding to the particular user device is blocked.

The validation server may further comprise instructions that, when executed by the processor, cause the validation server to execute the instructions to obtain an updated server partial secret key are as a result of receiving a message to block the server partial secret key.

The validation server may further comprise instructions that, when executed by the processor, cause the validation server to execute the instructions to obtain an updated server partial secret key regularly based on a schedule.

According to a third aspect, it is provided a computer program for applying a server partial secret key conditional on blocked status. The server partial secret key and a user partial secret key form part of a threshold cryptography scheme associated with a public key. The computer program comprises computer program code which, when executed on a validation server causes the validation server to: receive a request to apply a server partial secret key for a requested cryptographic operation for a user device; determine that the server partial secret key can validly be applied by determining that the server partial secret key is not blocked from being applied; interact with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation; and obtain an updated server partial secret key, corresponding to an updated user partial secret key that collectively form part of the threshold cryptography scheme that, wherein the update in partial secret keys still correspond to the public key.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein are based on threshold cryptography, where two (i.e. both) of two available partial secret keys are needed for performing a cryptographic operation. One partial secret key is stored in the user device and one partial secret key is stored on a validation server. If the user device is compromised, the validation server is informed of this and blocks the user of its partial secret key for that user device. In this way, the user device is effectively blocked from any cryptographic operations since it is required that also the validation server applies its partial secret key for the cryptographic operation to occur.

Figure 1:
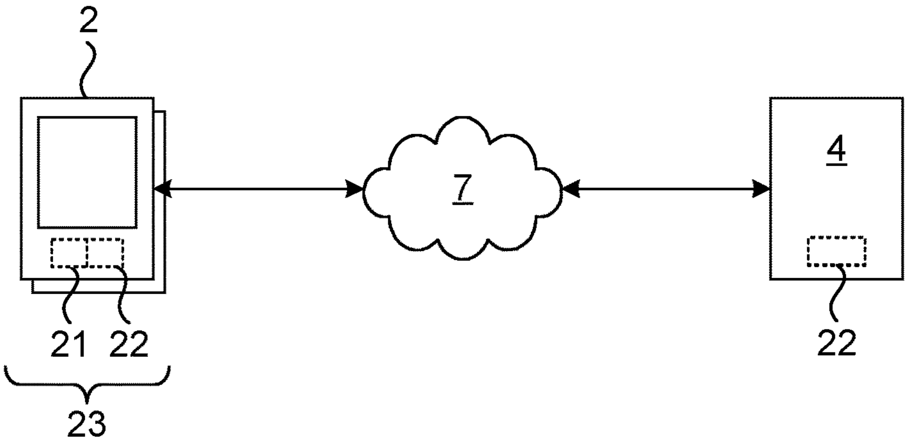
FIG. 1 is a schematic diagram illustrating how asymmetric cryptography operations can be performed in the prior art.

FIG. 1 is a schematic diagram illustrating how asymmetric cryptography operations can be performed in the prior art.

In traditional asymmetric cryptography there is a key pair 23 consisting of a public key 22 and a secret key 21. The public key 22 is associated with an entity or user and is shared publicly. The secret key 21 is coupled to the public key, but the secret key 21 is kept secret. Using the secret key 21, a user device 2 can perform a cryptographic operation, e.g. cryptographic signing or decryption.

In the example of FIG. 1, a user device 2, such as a smartphone, computer, wearable device, etc., stores the key pair 23 consisting of the public key 22 and the secret key 21. The user device 2 is connected to a communication network 7, such as the Internet. The public key 22 is shared and can thus e.g. be stored in an application server 4, that is also connected to the communication network 7. The application server 4 is any server with which the user device can interact, e.g. using an app (application) in the user device 2 or via a web browser.

In this way, the user device 2 can perform cryptographic operations, such as cryptographic signing or decryption, in cooperation with the application server 4. The application server 4 can also have its own key pair, consisting of a separate set of a public key and a secret key (not shown).

As mentioned in the background, this solution is vulnerable if the user device 2 is lost or stolen, in which case an attacker might be able to perform cryptographic operations using the stolen user device 2.

Figure 2:
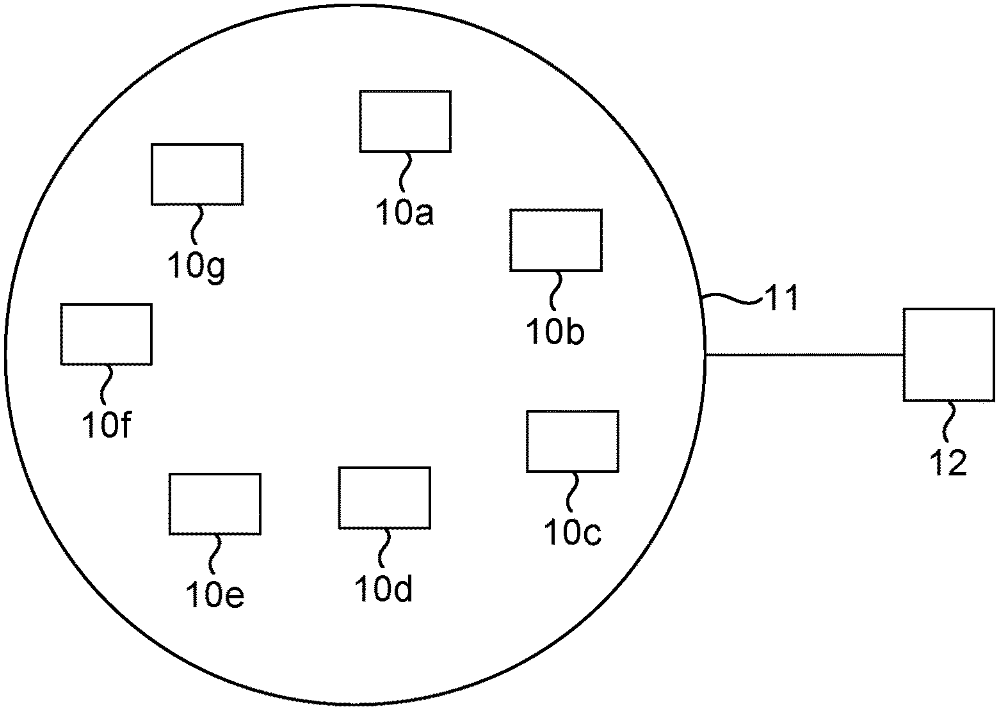
FIG. 2 is a schematic diagram illustrating the concept of threshold cryptography.

FIG. 2 is a schematic diagram illustrating the concept of threshold cryptography. Embodiments presented herein are based on threshold cryptography, which will now be explained with reference to FIG. 2.

A development in asymmetric cryptography, from its original key pair of a secret key and a public key, is threshold cryptography. In threshold cryptography, there is still a single public key 12, but cryptographic operations are achieved by a threshold number of associated partial secret keys 10*a-f* for respective entities. Jointly, the group of entities computes and communicates to generate the set of partial secret keys and the associated public key. Each entity its partial secret key. It is to be noted that each partial secret key is secret and is only known to the entity itself. There is no need for this partial secret key to be exposed to any other entity, not even in the key creation phase. Hence, there is no need for a central authority that distributes these partial secret keys.

The threshold condition can be expressed as (t, n), where n denotes the number of available partial secret keys and t denotes the number of partial secret keys that are needed to perform a cryptographic operation (e.g. decryption or signing) corresponding to the (single) public key. For instance, in correspondence with the example of FIG. 2, a (3, 6) threshold cryptography scheme requires that at least 3 out of 6 associated partial secret keys 10*a-g* are applied to perform the cryptographic operation. When at least the threshold number of partial secret keys are applied, this cryptographic operation secured by the threshold cryptography scheme 11 is performed. It does not matter which particular partial secret keys are applied, as long as at least the threshold number of partial secret keys are applied. The threshold cryptography scheme is defined when the partial secret keys are generated.

Optionally, the partial secret keys can be refreshed. This can be done to limit the lifetime of the partial secret keys, (which makes it even harder for an attacker who needs to compromise at least t parties within a time window defined by the lifetime). The refresh can also be performed done to consolidate the partial secret keys.

For instance, if an entity holding a partial secret key is lost, it makes sense to regenerate the partial secret keys, now for the remaining entities of the group. It is to be noted that the refresh does not affect the public key—the same public key that was used prior to the refresh can be used after the refresh. Again, the refresh is performed without sharing any of the partial secret keys while doing the collaborative refresh computation, e.g. based on multi-party computation, available at the time that this patent application is filed.

Using threshold cryptography, a compromise of a single device never leads to a compromise of the whole threshold cryptography scheme, significantly increasing security.

Threshold cryptography can e.g. be implemented using an Elliptic Curve Digital Signature Algorithms (ECDSA). An example implementation is the Binance implementation, available at the time of filing of this patent application.

Figure 3:
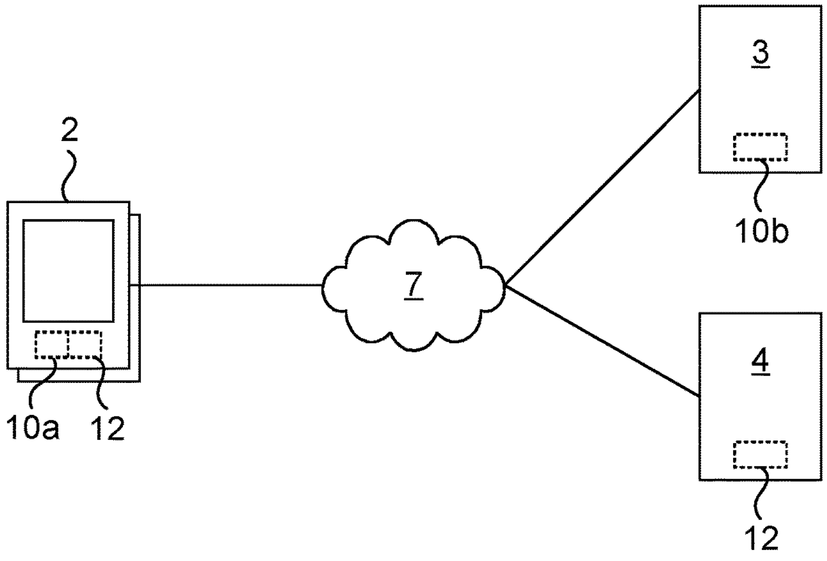
FIG. 3 is a schematic diagram illustrating an environment in which embodiments presented herein can be applied.

FIG. 3 is a schematic diagram illustrating an environment in which embodiments presented herein can be applied. The context is similar to that of FIG. 1, where a user device 2 interacts with an application server 4 over a communication network 7 to apply a cryptographic operation corresponding to a public key 12 available to the application server 4. Here, however, there is also a validation server 3. There is still a single public key 12, but instead of a single secret key, the secret key operations are performed using a threshold cryptography scheme based on a user partial secret key 10*a*, stored in the user device 2, and a server partial secret key 10*b*, stored in the validation server 3. It is to be noted that no single secret key corresponding to the public key 12 exists that could be stolen. Instead, secret cryptographic operations are achieved by separate utilisation of the partial secret keys 10*a*, 10*b* of the threshold cryptography scheme.

For a cryptographic operation to be applied, it is thus required that both partial secret keys 10*a*, 10*b*, are applied. In other words, in accordance with the nomenclature established above, a (2, 2) threshold scheme is applied for performing cryptographic operations.

For this solution, the partial signatures can e.g. be implemented by signing of JWT (JSON (JavaScript Object Notation) Web Token) with JWS (JSON Web Signature). An LDP (Linked Data Platform) server can then validate the signatures against a stored public key obtained during client registration.

Figure 4:
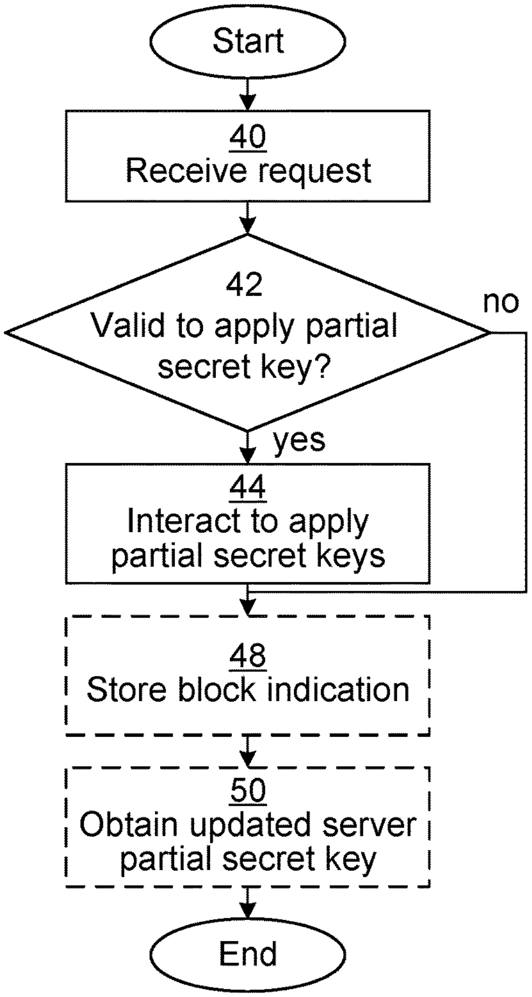
FIG. 4 is a flow chart illustrating embodiments of methods for applying a server partial secret key conditional on blocked status.

FIG. 4 is a flow chart illustrating embodiments of methods for applying a server partial secret key conditional on blocked status. The server partial secret key 10*b* and a user partial secret key 10*a* form part of a threshold cryptography scheme 11 associated with a public key 12. The method is performed in a validation server 3. It is to be noted that from the perspective of the validation server 3, the method can be performed in parallel for respective user devices. In this case, the validation server 3 holds separate server partial secret keys for each user device.

In a receive request step 40, the validation server 3 receives a request to apply a server partial secret key 10*b* for a requested cryptographic operation for a user device 2. As mentioned above, the cryptographic operation can e.g. be to perform cryptographic signing and/or decryption, for interacting with the application server, e.g. for authorisation, etc.

In a conditional valid to apply partial secret key step 42, the validation server 3 evaluates whether the server partial secret key 10*b* can validly be applied by determining that the server partial secret key 10*b* is not blocked from being applied. In other words, the validation server 3 actively checks whether the server partial secret key 10*b* (of the user device for which the method is performed) is blocked from being applied. This validation can be performed in several different ways based on one or more conditions.

One condition that may need to be true for applying the server partial secret key 10*b* can be that a current time is within a pre-defined validity schedule. For instance, the partial secret key 10*b* can be scheduled to be applied only during office hours (e.g. for accessing work documents), weekdays or weekends.

One condition that may need to be true for applying the server partial secret key 10*b* can be that an application of the cryptographic operation complies with a pre-defines set of valid applications. Examples of such applications can be payments (lower than a set limit or without any limit), document signing, logging in to a set of preapproved services (e.g. web sites or application (app) services), etc.

When it is determined that the server partial secret key 10*b* can validly be applied, the method proceeds to an interact to apply partial secret keys step 44. Otherwise, the method proceeds to the optional receive message to block step 46, the method proceeds the optional obtain updated server partial secret key step 50, or the method ends.

In the interact to apply partial secret keys step 44, the validation server 3 interacts with the user device 2 to perform the requested cryptographic operation. This makes the user device 2 apply the user partial secret key 10*a* and the validation server apply the server partial secret key 10*b*. Threshold cryptography is employed such that at least two partial secret keys 10*a-b* of the threshold cryptography scheme 11 are required for the requested cryptographic operation. For instance, the threshold can be that two out of two partial secret keys 10*a-b* need to be applied or three out of three partial secret keys need to be applied. In any case, the threshold scheme is devised such that the server is required to apply its server partial secret key for performing the requested cryptographic operation, thereby forcing the check for potential blocking at the validation server.

Hence, as long as the validation is positive in step 42, the validation server applies its partial secret key, to support the cryptographic operation. In this way, the validation server 3 provides a conditional approval service for applying the server-side partial secret key for the user device 2.

In the optional receive message to block step 46, the validation server 3 receives 46 a message to block the server partial secret key 10*b* corresponding to a particular user device 2.

In an optional store block indication step 48, the validation server 3 stores 48 an indication that the server partial secret key 10*b* corresponding to the particular user device 2 is blocked. This indication will then block validation for that user device 2 in a subsequent iteration of step 42.

Hence, using steps 46 and 48, if the user device 2 is compromised, e.g. stolen or lost, the user can signal (directly or indirectly) to the validation server over a separate channel that the server partial secret key should be blocked for that user device, effectively blocking future validations (verified in step 42) In this way, if an attacker somehow manages to make the compromised user device apply its partial secret key for authentication, this is not sufficient, since the validation server has blocked its approval service for that user device.

In the optional obtain updated server partial secret key step 50, the validation server 3 obtains an updated server partial secret key, corresponding to an updated user partial secret key that collectively form part of the threshold cryptography scheme 11. The update in partial secret keys still correspond (collectively) to the public key 12. This update is also known as refresh (as described above) or key rotation.

An analogy of how the key rotation is now illustrated with a fictive, but easily understood, cryptographic operation of addition of the partial secret keys. In this case, both partial secret keys are added to a data item being a number n. The first partial secret key is denoted $k_1$ and the second partial secret key is denoted $k_2$. The fictive cryptographic operation involves respectively adding the partial secret keys to the number, resulting in $n+k_1+k_2$, a result which is verifiable by the public key. When the keys are updated, this can be achieved by adding an offset os to one partial secret key and subtracting the same offset os from the other partial secret key, resulting in updated secret keys $(k_1+os)$ and $(k_2-os)$. When both updated keys are applied to the number n, this results in $n+(k_1+os)+(k_2-os)=n+k_1+k_2$, i.e. the same result as before the update. It is thus clear how that, even after the update, the same public key can be used for verification. Significantly, one original partial secret key cannot be used in conjunction with the other partial secret key after the update, since, e.g. $(k_1+os)+k_1+k_1+k_2$. In reality, the addition and subtraction can be much more complex operations, but the same principles apply.

Using the key rotation, only corresponding updated user partial secret keys can be used, effectively invalidating any previous instances of user partial secret keys, e.g. in a compromised user device.

The obtain updated server partial secret key step 50 can be performed as a result of receiving a message to block the server partial secret key 10*b*.

Alternatively, the obtain updated server partial secret key step 50 can be performed regularly based on a schedule, e.g. periodically based on a fixed period.

It is to be noted that the user partial secret key can, in turn, be based on a threshold scheme, e.g. a (2, 3) scheme of partial secret keys provided to a computer, a phone and a wearable device.

By applying the threshold cryptography scheme, verification of any cryptographic operation based on the public key can be performed as known in the art for a traditional key pair consisting of a public key and a secret key. In other words, no modification is required for verification of partial secret keys of a threshold scheme compared to traditional asymmetric cryptography. Moreover, blocking operations are enabled without the need for any exchange of public keys.

Figure 5:
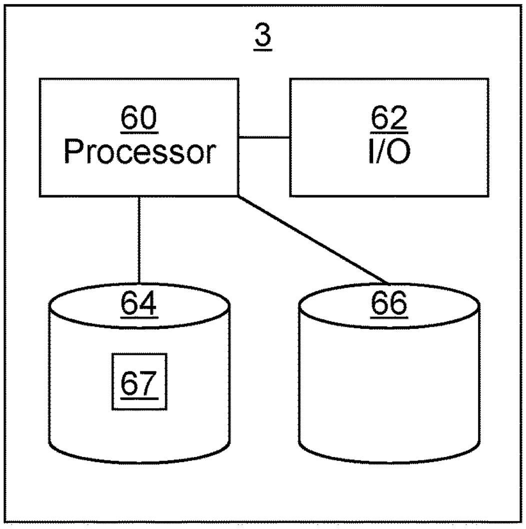
FIG. 5 is a schematic diagram illustrating components of the validation server of FIG. 3.
Figure 7:
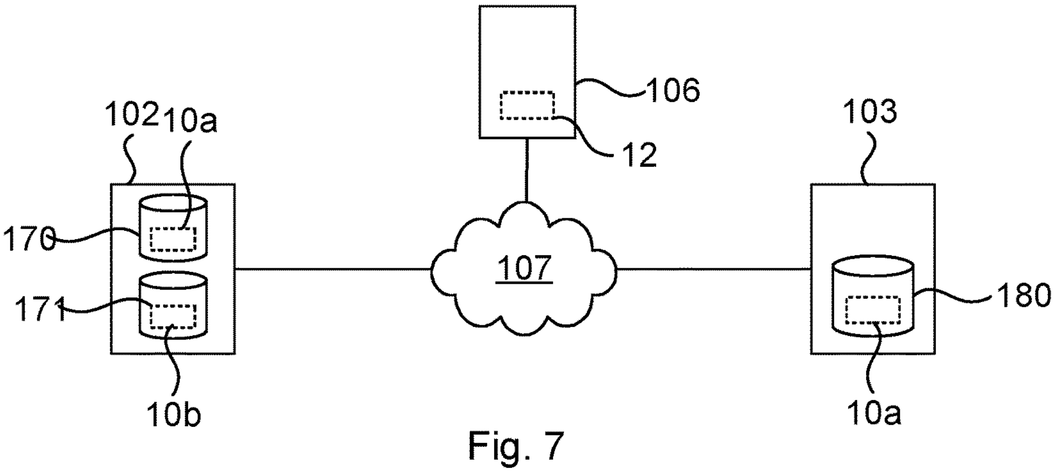
FIG. 7 is a schematic diagram illustrating an environment in which embodiments presented herein can be applied.

FIG. 5 is a schematic diagram illustrating components of the validation server 3 of FIG. 3 and/or the electronic device 102 of FIG. 7. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 4 above.

The memory 64 can be any combination of random-access memory (RAM) and/or read-only memory (ROM). The memory 64 also comprises non-transitory persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The validation server 3 further comprises an I/O interface 62 for communicating with external and/or internal entities, such as the user device 2 via the communication network 7.

Other components of the validation server 3 are omitted in order not to obscure the concepts presented herein.

Figure 6:
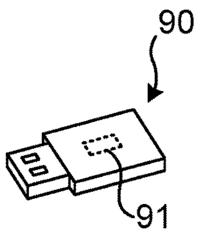
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 5. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Here Now Follows an Itemized List of Embodiments

A1. A method for applying a server partial secret key conditional on blocked status, wherein the server partial secret key and a user partial secret key form part of a threshold cryptography scheme associated with a public key, the method being performed in a validation server, the method comprising:

receiving a request to apply a server partial secret key for a requested cryptographic operation for a user device;

determining that the server partial secret key can validly be applied by determining that the server partial secret key is not blocked from being applied; and interacting with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation.

A2. The method according to item A1, wherein the determining that the server partial secret key can validly be applied comprises determining that a current time is within a pre-defined validity schedule.

A3. The method according to any one of the preceding items, wherein the determining that the server partial secret key can validly be applied comprises determining that an application of the cryptographic operation complies with a pre-defines set of valid applications.

A4. The method according to any one of the preceding items, further comprising:

receiving a message to block the server partial secret key corresponding to a particular user device; and storing an indication that the server partial secret key corresponding to the particular user is blocked.

A5. The method according to any one of the preceding items, further comprising:

obtaining an updated server partial secret key, corresponding to an updated user partial secret key that collectively form part of the threshold cryptography scheme that, wherein the update in partial secret keys still correspond to the public key.

A6. The method according to item A5 when dependent on item A4, wherein obtaining an updated server partial secret key is performed as a result of receiving a message to block the server partial secret key.

A7. The method according to item A5, wherein the obtaining an updated server partial secret key is performed regularly based on a schedule.

A8. A validation server for applying a server partial secret key conditional on blocked status, wherein the server partial secret key and a user partial secret key form part of a threshold cryptography scheme associated with a public key, the validation server comprising:

a processor; and a memory storing instructions that, when executed by the processor, cause the validation server to:

receive a request to apply a server partial secret key for a requested cryptographic operation for a user device;

determine that the server partial secret key can validly be applied by determining that the server partial secret key is not blocked from being applied; and interact with the user device to perform the requested cryptographic operation, such that the user device applies the user partial secret key and the validation server applies the server partial secret key, wherein a threshold of two partial secret keys of the threshold cryptography scheme are required for applying the threshold cryptography scheme for performing the requested cryptographic operation.

A9. The validation server according to item A8, wherein the instructions to determine that the server partial secret key can validly be applied comprise instructions that, when executed by the processor, cause the validation server to determine that a current time is within a pre-defined validity schedule.

A10. The validation server according to any one of items A8 or A9, wherein the instructions to determine that the server partial secret key can validly be applied comprise instructions that, when executed by the processor, cause the validation server to determine that an application of the cryptographic operation complies with a pre-defines set of valid applications.

A11. The validation server according any one of items A8 to A10, further comprising instructions that, when executed by the processor, cause the validation server to:

receive a message to block the server partial secret key corresponding to a particular user device; and store an indication that the server partial secret key corresponding to the particular user device is blocked.

A12. The validation server according to any one of items A8 to A11, further comprising instructions that, when executed by the processor, cause the validation server to:

obtain an updated server partial secret key, corresponding to an updated user partial secret key that collectively form part of the threshold cryptography scheme that, wherein the update in partial secret keys still correspond to the public key.

A13. The validation server according to item A12 when dependent on item A11, further comprising instructions that, when executed by the processor, cause the validation server to execute the instructions to obtain an updated server partial secret key are as a result of receiving a message to block the server partial secret key.

A14. The validation server according to item A12, further comprising instructions that, when executed by the processor, cause the validation server to execute the instructions to obtain an updated server partial secret key regularly based on a schedule.

A15. A computer program for applying a server partial secret key conditional on blocked status, wherein the server partial secret key and a user partial secret key form part of a threshold cryptography scheme associated with a public key, the computer program comprising computer program code which, when executed on a validation server causes the validation server to:

receive a request to apply a server partial secret key for a requested cryptographic operation for a user device;

determine that the server partial secret key can validly be applied by determining that the server partial secret key is not blocked from being applied; and interact with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation.

A16. A computer program product comprising a computer program according to item A15 and a computer readable means comprising non-transitory memory in which the computer program is stored.

Second Set of Embodiments

Electronic devices are becoming abundant in modern life. Electronic devices are provided as personal user device, e.g.

computers, smartphones, wearable devices. Also, electronic devices are provided in the field, e.g. as ATM (Automatic Teller Machines), vending machines, information kiosks, etc.

However, there is a risk of theft for any equipment with value. This is a particular problem for electronic devices that are in the field. Any improvement in preventing stolen equipment from being used would be of great benefit, since that can deter thefts from occurring in the first place.

According to the second set of embodiments, it is provided a way to authenticate an electronic device. This is based on threshold cryptography where, upon the electronic device initialising the electronic device obtains at least a first partial secret key from a key server. A second partial secret key is retrieved from non-volatile memory in the electronic device. Both partial secret keys are then used for performing an action in the electronic device (that cannot be performed without having access to both partial secret keys. For instance, the action can be authenticating with an authentication server, in which case a positive authentication is necessary for normal operation of the electronic device. Other examples of actions are decrypting data stored in the non-volatile memory, communicating with an external entity, communicating with an internal entity in which the electronic device 102. If the electronic device is stolen, the owner/operator of the electronic device reports the theft, and the key server is prevented from supplying the first partial secret key when requested. In this way, when the stolen electronic device is initialised, it will be unable to perform the action and normal operation is prevented. This makes the electronic device inoperable and thus reduces any gain from stealing the electronic device in the first place.

FIG. 7 is a schematic diagram illustrating an environment in which embodiments presented herein can be applied. An electronic device 102 can be any suitable electronic device. For instance, the electronic device 102 can be a mains-powered device such as a vending machine, ATM, information kiosk, etc. When the electronic device 102 is mains powered, if the electronic device is stolen, any data in the volatile memory is lost when the electronic device is disconnected from power. Alternatively, the electronic device can form part of a vehicle. Alternatively, the electronic device can be a user device, such as a smartphone, mobile phone, wearable device, tablet computer, laptop computer, desktop computer, digital physical key (e.g. key fob, key card), etc. It is to be noted that the embodiments presented herein can be applied for multiple electronic devices even though only one is shown in FIG. 7. The electronic device 102 is, at least occasionally, connected to a communication network 107, such as the Internet.

A key server 103 is used to supply a key to the electronic device 102 to enable authentication of the electronic device 102. It is to be noted that the key server 103 can be used in parallel for multiple electronic devices even if its operation in relation to a single electronic device is described herein. The key server 103 comprises non-volatile memory 180 e.g. in the form of magnetic memory, optical memory and/or non-volatile solid-state memory. The non-volatile memory 180 stores a first partial secret key 10*a*, associated with the electronic device 102.

The electronic device 102 comprises a volatile memory 170 and a non-volatile memory 171. The volatile memory 170 can be in the form of RAM (Random Access Memory) or other type of memory for which any stored data is lost or cleared when the electronic device 102 is powered off or when initialised or reinitialised. The reinitialization can be performed based on a schedule, e.g. every hour, every day, every week, etc. Optionally, the electronic device 102 comprises one or more tampering detection devices. If tampering or any type of theft detection is detected, this can trigger the volatile memory 170 to be reinitialised, which includes clearing the non-volatile memory, or at least the first partial secret key is cleared from the volatile memory. One example of theft detection is to detect an uncharacteristic vibration, e.g. indicating that an electronic device 102 that is normally stationary is moving. Another example of theft detection is a GPS (Global Positioning System) receiver in the electronic device 102 that detects that the device is in an unexpected location.

The non-volatile memory 171 can be in the form of magnetic memory, optical memory or non-volatile solid-state memory. Data stored in the non-volatile memory 171 is retained even when the electronic device 102 is powered off. Upon initialisation, the volatile memory 170 does not contain any partial secret keys. The electronic device 102 communicates with the key server 103 to request the first partial secret key 10*a* and, when received, stores the first partial secret key 10*a* in the volatile memory 170. The non-volatile memory 171 stores a second partial secret key 10*b*.

Optionally, an authentication server 106 is provided to authenticate the electronic device 102 when the electronic device 102 initialises. As described in more detail below, the authentication server 106 performs the authentication based on a public key 12 associated with a threshold cryptography scheme containing the first partial secret key 10*a* and the second partial secret key 10*b*. The public key 12 is available to the authentication server 106 prior to or as part of the authentication process. The authentication is thus performed in communication with the electronic device 102, against the public key 12. The electronic device 102 needs to be in possession of both the first partial secret key 10*a* and the second partial secret key 10*b* for the authentication to be positive. Only after positive authentication is possible for the electronic device 102 to enter a normal operational mode to perform the functions of the electronic device 102.

Each one of the authentication server 106 and the key server 103 can be implemented using any suitable server hardware and software. In one embodiment, the authentication server 106 and the key server 103 are combined in a single physical device. It is to be noted, however, that during the authentication by the authentication server 106, the first partial secret key 10*a* must be supplied by the electronic device 102, and not from the memory 180 of the key server 103.

Figure 8:
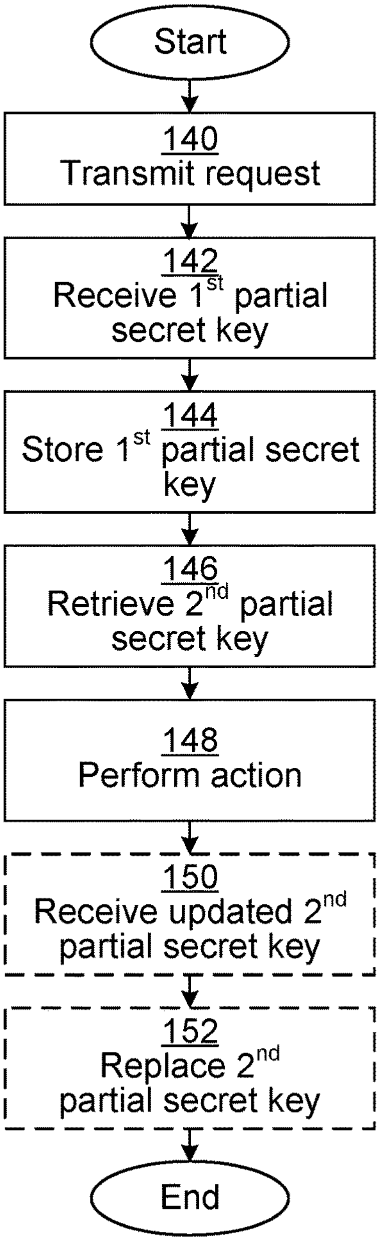
FIG. 8 is a flow chart illustrating embodiments of methods for performing an action by an electronic device, based on a first partial secret key and a corresponding second partial secret key.

FIG. 8 is a flow chart illustrating embodiments of methods for performing an action by an electronic device 102, based on a first partial secret key 10*a* and a corresponding second partial secret key 10*b*. The first partial secret key 10*a* and the second partial secret key 10*b* form part of a threshold cryptography scheme 11 associated with a public key 12. The method is performed by the electronic device 102.

In a transmit request step 140, the electronic device 102 transmits, upon the device initialising, a request for a first partial secret key 10*a* to a key server 103. The request contains some type of identifier of the electronic device 102, to allow the key server 103 to find the first partial secret key 10*a* that corresponds to the particular electronic device. The initialising can e.g. be the electronic device booting up or transitioning from a standby state to an operational state. Alternatively, the initialising can be a regularly-triggered initialising. After the initialising is performed, the first partial secret key 10*a* is not stored in the electronic device (and, in particular, the first partial secret key 10*a* is not stored in the volatile memory 170 of the electronic device 102). The removal of any partial secret key 10*a* from the volatile memory can be an effect of entering the standby state (e.g. powering off will automatically clear the RAM memory) or the removal can be part of the initialisation.

The key server 103 checks if there are anything blocking the provision of the first partial key server 10*a* to the electronic device 102. For instance, if the electronic device 102 has been reported stolen, there is an indication (e.g. in a list or in a database) available to the key server 103 that the key server 103 is blocked from supplying the first partial secret key 10*a* corresponding to the particular electronic device 102. Hence, if the key server 103 is blocked from providing the first partial secret key 10*a* for this electronic device 102, the method ends. Otherwise, the key server 103 proceeds and transmits the first partial secret key 10*a* to the electronic device 102 over the communication network 107.

In a receive 1st partial secret key step 142, the electronic device 102 receives the first partial secret key 10*a* from the key server 103.

In a store 1st partial secret key 144, the electronic device 102 stores the first partial secret key 10*a* only in volatile memory 170. Hence, the first partial secret key 10*a* is now available in the electronic device 102. However, since the first partial secret key 10*a* is only stored in the volatile memory 170, the first partial secret key 10*a* is lost if the electronic device powers off, after which this method needs to be repeated, allowing the key server 103 to act as a check point, checking for any blocked (e.g. stolen) electronic keys 2.

In a retrieve 2nd partial secret key 146, the electronic device 102 retrieves a second partial secret 10*b* from non-volatile memory 171. The second partial secret key 10*b* can be securely stored in non-volatile memory 171 since it is only usable in collaboration with the first partial secret key 10*a* that is stored in the volatile memory 170.

In an perform action step 148, the electronic device performs an action based on applying both the first partial secret key 10*a* and the second partial secret key 10*b*. For instance, this can comprise interacting with an authentication server 106 to authenticate the electronic device 102 based on performing a cryptographic operation. This interaction comprises that the electronic device 102 applies both the first partial secret key 10*a* and the second partial secret key 10*b*. In the threshold cryptography scheme, a threshold of at least two out of the partial secret keys of the threshold cryptography scheme 11 are required for applying the threshold cryptography scheme 11 (for performing the cryptographic operation). When this authentication is performed, a positive authentication is necessary for normal operation of the electronic device 102. In other words, if the authentication with the authentication server 106 fails, the electronic device 102 sets itself in a non-operational state, such as a standby state.

Another action can be decrypting data stored in the non-volatile memory 171, where the data is encrypted with the public key.

Another action can be communicating with an external entity, such as a server, etc, where the external entity can verify the identity of the electronic device 102 using the public key.

Another action can be communicating with an internal entity in which the electronic device 102 is provided. For example, the main control computer of a vehicle may need to authenticate itself to the engine to be allowed to start the engine, where the authentication is based on applying both partial secret keys, which is verified using the public key.

The interacting with the authentication server 106 can comprise applying a cryptographic signature to a data item provided by the authentication server 106.

In an optional receive updated 2nd partial secret key step 150, the electronic device 102 receives an updated second partial secret key. The updated second partial secret key corresponds to an updated first partial secret key that collectively form part of the same (pre-update) threshold cryptography scheme 11. Hence, the updated first partial secret key and the updated second partial secret key collectively still correspond to the public key 12. This can be useful if the electronic device 102 has been stolen and is subsequently returned. By updating the partial secret keys 10*a*, 10*b*, there is no use of the second partial secret key 10*b* that may have been compromised during the time that the electronic device 102 was stolen.

In an optional replace 2nd partial secret key step 152, the electronic device 102 replaces the previously stored second partial secret key in non-volatile memory with the updated second partial secret key. In this way, only the updated partial secret keys 10*a*, 10*b* for the electronic device 102 are used, but these still correspond to the original public key 12.

In one embodiment, the threshold number is two and the threshold cryptography scheme contains only two partial secret keys 10*a-b*. In other words, both (and the only available) partial secret keys 10*a-b* need to be applied in the authentication to yield a positive result. As explained above, the threshold cryptography scheme 11 can e.g. be based on an Elliptic Curve Digital Signature Algorithm.

This solution can be of great value for computers in the field, e.g. vending machines, ATMs, information kiosks, etc. If someone steals such a device, when it is initialised again, it will need to communicate with the remote service for authentication. Additionally, embodiments presented herein can be applied for any high value device, e.g. vehicle, that can be made unoperational using the precented solution. When the theft is detected, the owner of the device can inactivate the remote service part of the authentication for the machine, whereby authentication will fail on powering up the machine.

Here Now Follows a Set of Items for the Second Set of Embodiments

B11. A method for performing an action by an electronic device (2), based on a first partial secret key and a corresponding second partial secret key, wherein the first partial secret key and the second partial secret key form part of a threshold cryptography scheme associated with a public key, the method being performed by the electronic device, the method comprising:

- transmitting, upon the device initialising, a request for a first partial secret key to a key server;
- receiving the first partial secret key from the key server;
- storing the first partial secret key only in volatile memory;
- retrieving a second partial secret key from non-volatile memory; and
- performing an action based on applying both the first partial secret key and the second partial secret key.

B2. The method according to item B1, wherein the performing an action comprises: interacting with an authentication server to authenticate the electronic device based on performing a cryptographic operation, such that the electronic device applies both the first partial secret key and the second partial secret key, wherein a threshold of at least two out of the partial secret keys of the threshold cryptography scheme are required for applying the threshold cryptography scheme for performing the cryptographic operation, wherein a positive authentication is necessary for normal operation of the electronic device.

B3. The method according to item B1 or B2, wherein the performing an action comprises at least one of the following: decrypting data stored in the non-volatile memory, communicating with an external entity, communicating with an internal entity in which the electronic device is provided.

B4. The method according to any one of items B1 to B4, further comprising: receiving an updated second partial secret key, corresponding to an updated first partial secret key that collectively form part of the threshold cryptography scheme that still corresponds to the public key; and replacing the previously stored second partial secret key in non-volatile memory with the updated second partial secret key.

B5. The method according to any one of items B1 to B4, wherein the interacting comprises applying a cryptographic signature to a data item provided by the authentication server.

B6. The method according to any one of items B1 to B5, wherein the threshold number is two and the threshold cryptography scheme contains only two partial secret keys.

B7. The method according to any one of items B1 to B6, wherein the threshold cryptography scheme is based on an Elliptic Curve Digital Signature Algorithm, ECDSA.

B8. An electronic device for performing an action by based on a first partial secret key and a corresponding second partial secret key, wherein the first partial secret key and the second partial secret key form part of a threshold cryptography scheme associated with a public key, the electronic device comprising:

- a processor; and
- a memory storing instructions that, when executed by the processor, cause the electronic device to:
- transmit, upon the device initialising, a request for a first partial secret key to a key server;
- receive the first partial secret key from the key server;
- store the first partial secret key only in volatile memory;
- retrieve a second partial secret key from non-volatile memory; and
- perform an action based on applying both the first partial secret key and the second partial secret key.

B9. The electronic device according to item B8, wherein the instructions to perform an action comprise instructions that, when executed by the processor, cause the electronic device to:

- interact with an authentication server to authenticate the electronic device based on performing a cryptographic operation, such that the electronic device applies both the first partial secret key and the second partial secret key, wherein a threshold of at least two out of the partial secret keys of the threshold cryptography scheme are required for applying the threshold cryptography scheme for performing the cryptographic operation, wherein a positive authentication is necessary for normal operation of the electronic device.

B10. The electronic device according to item B8 or B9, wherein the instructions to perform an action comprise instructions that, when executed by the processor, cause the electronic device to perform at least one of the following: decrypting data stored in the non-volatile memory, communicating with an external entity, communicating with an internal entity in which the electronic device is provided.

B11. The electronic device according to any one of items B8 to B10, further comprising instructions that, when executed by the processor, cause the electronic device to:

- receive an updated second partial secret key, corresponding to an updated first partial secret key that collectively form part of the threshold cryptography scheme that still corresponds to the public key; and
- replace the previously stored second partial secret key in non-volatile memory with the updated second partial secret key.

B12. The electronic device according to any one of items B8 to B11, wherein the instructions to interact comprise instructions that, when executed by the processor, cause the electronic device to apply a cryptographic signature to a data item provided by the authentication server.

B13. The electronic device according to any one of items B8 to B12, wherein the threshold number is two and the threshold cryptography scheme contains only two partial secret keys.

B14. The electronic device according to any one of items B8 to B13, wherein the threshold cryptography scheme is based on an Elliptic Curve Digital Signature Algorithm, ECDSA.

B15. A computer program for performing an action by an electronic device based on a first partial secret key and a corresponding second partial secret key, wherein the first partial secret key and the second partial secret key form part of a threshold cryptography scheme associated with a public key, the computer program comprising computer program code which, when executed on an electronic device causes the electronic device to:

- transmit, upon the device initialising, a request for a first partial secret key to a key server;
- receive the first partial secret key from the key server;
- store the first partial secret key only in volatile memory;
- retrieve a second partial secret key from non-volatile memory; and
- perform an action based on applying both the first partial secret key and the second partial secret key.

B16. A computer program product comprising a computer program according to item B15 and a computer readable means comprising non-volatile memory in which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for applying a server partial secret key conditional on blocked status, wherein the server partial secret key and a user partial secret key form part of a threshold cryptography scheme associated with a public key, the method being performed in a validation server, the method comprising:

- receiving a request to apply the server partial secret key for a requested cryptographic operation for a user device;
- determining that the server partial secret key is able to be validly applied by:

(i) determining that the server partial secret key is not blocked from being applied by a stored indication that the server partial secret key corresponding to the user device is blocked, (ii) determining that a current time is within a pre-defined recurring validity time window, and (iii) determining that an application of the cryptographic operation complies with a pre-defined set of valid applications;

interacting with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation;

receiving a blocking message to block the server partial secret key corresponding to a particular user device;

storing, in response to the received blocking message, a dedicated blocking indication that the server partial secret key corresponding to the particular user device is blocked, wherein the dedicated blocking indication is subsequently checked to gate access to the server partial secret key; and obtaining an updated server partial secret key, corresponding to an updated user partial secret key that collectively form part of the threshold cryptography scheme, wherein the updated partial secret keys still correspond to the public key.

2. The method according to claim 1, wherein obtaining the updated server partial secret key is performed as a result of receiving the blocking message to block the server partial secret key.

3. The method according to claim 1, wherein obtaining the updated server partial secret key is performed regularly based on a schedule.

4. A validation server for applying a server partial secret key conditional on blocked status, wherein the server partial secret key and a user partial secret key form part of a threshold cryptography scheme associated with a public key, the validation server comprising:

a processor; and a memory storing instructions that, when executed by the processor, cause the validation server to:

receive a request to apply the server partial secret key for a requested cryptographic operation for a user device;

determine that the server partial secret key is able to be validly applied by:

(i) determining that the server partial secret key is not blocked from being applied by a stored indication that the server partial secret key corresponding to the user device is blocked, (ii) determining that a current time is within a pre-defined recurring validity time window, and (iii) determining that an application of the cryptographic operation complies with a pre-defined set of valid applications;

interact with the user device to perform the requested cryptographic operation, such that the user device applies the user partial secret key and the validation server applies the server partial secret key, wherein a threshold of two partial secret keys of the threshold cryptography scheme are required for applying the threshold cryptography scheme for performing the requested cryptographic operation;

receive a blocking message to block the server partial secret key corresponding to a particular user device;

store, in response to the received blocking message, a dedicated blocking indication that the server partial secret key corresponding to the particular user device is blocked, wherein the dedicated blocking indication is subsequently checked to gate access to the server partial secret key; and obtain an updated server partial secret key, corresponding to an updated user partial secret key that collectively form part of the threshold cryptography scheme, wherein the updated partial secret keys still correspond to the public key.

5. The validation server according to claim 4, further comprising instructions that, when executed by the processor, cause the validation server to execute the instructions to obtain the updated server partial secret key as a result of receiving the blocking message to block the server partial secret key.

6. The validation server according to claim 4, further comprising instructions that, when executed by the processor, cause the validation server to execute the instructions to obtain the updated server partial secret key regularly based on a schedule.

7. A non-transitory computer-readable medium comprising a computer program stored thereon for applying a server partial secret key conditional on blocked status, wherein the server partial secret key and a user partial secret key form part of a threshold cryptography scheme associated with a public key, the computer program comprising computer program code which, when executed on a validation server, causes the validation server to:

receive a request to apply the server partial secret key for a requested cryptographic operation for a user device;

determine that the server partial secret key is able to be validly applied by:

(i) determining that the server partial secret key is not blocked from being applied by a stored indication that the server partial secret key corresponding to the user device is blocked, (ii) determining that a current time is within a pre-defined recurring validity time window, and (iii) determining that an application of the cryptographic operation complies with a pre-defined set of valid applications;

interact with the user device to perform the requested cryptographic operation, such that the user device applies the user partial secret key and the validation server applies the server partial secret key, wherein a threshold of at least two partial secret keys of the threshold cryptography scheme are required for applying the threshold cryptography scheme for performing the requested cryptographic operation;

receive a blocking message to block the server partial secret key corresponding to a particular user device;

store, in response to the received blocking message, a dedicated blocking indication that the server partial secret key corresponding to the particular user device is blocked, wherein the dedicated blocking indication is subsequently checked to gate access to the server partial secret key; and obtain an updated server partial secret key, corresponding to an updated user partial secret key that collectively form part of the threshold cryptography scheme, wherein the updated partial secret keys still correspond to the public key.

* * * * *